United States Patent
Crandall

(10) Patent No.: US 6,587,563 B1
(45) Date of Patent: *Jul. 1, 2003

(54) CRYPTOGRAPHIC SYSTEM USING CHAOTIC DYNAMICS

(75) Inventor: Richard Eugene Crandall, Portland, OR (US)

(73) Assignee: Apple Computer, Inc., Cupertino, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/801,939

(22) Filed: Feb. 15, 1997

(51) Int. Cl.$^7$ ................................................ H04L 9/00
(52) U.S. Cl. .......................... 380/263; 380/44; 380/46; 380/28
(58) Field of Search .......................... 380/44, 4, 9, 49, 380/23, 25, 263, 46, 28

(56) References Cited

U.S. PATENT DOCUMENTS

| | | | | |
|---|---|---|---|---|
| 5,048,086 A | * | 9/1991 | Bianco et al. | 380/28 |
| 5,291,555 A | * | 3/1994 | Cuomo et al. | 380/6 |
| 5,365,588 A | * | 11/1994 | Bianco et al. | 380/42 |
| 5,365,589 A | * | 11/1994 | Gutowitz | 380/43 |
| 5,379,346 A | * | 1/1995 | Pecora et al. | 380/48 |
| 5,432,697 A | * | 7/1995 | Hayes | 364/158 |
| 5,442,705 A | * | 8/1995 | Miyano | 380/29 |
| 5,479,513 A | * | 12/1995 | Protopopescu et al. | 380/28 |
| 5,596,511 A | * | 1/1997 | Toyoda et al. | 364/527 |
| 5,680,462 A | * | 10/1997 | Miller et al. | 380/48 |

FOREIGN PATENT DOCUMENTS

| EP | 0503119 | 3/1991 |
|---|---|---|
| EP | 0467239 | 7/1991 |

OTHER PUBLICATIONS

"Microcomputer Tools for Chaos," by Alan Wolf, the Conference on Computers in Physics Instruction, proceedings, pp. 145–146, Aug. 1988.*

"GRAPE: Project for a dedicated Tera–flops Computer," by Sugimoto et al., IEEE (Proceedings the First Aizu International Symposium on Parrllel Algorithms/Architecture Synthesis) pp38–44, Mar. 1995.*

"Grape–4: A Teraflops Massively Parallel Special–Purpose Computer System for Astrophysical N–Body Simulations," by Taiji et al., IEEE (Proceedings of the 8th Int. Parallel Processing Symposium), pp 280–287, Apr. 1994.*

"HARP chip: A 600 Mflops Application–Specific LSI for Astrophysical N–Body Simulations," by Taiji et al., IEEE (Proceedings of 27th Hawaii Int. Conference on Systems Sciences), pp. 302–311, Jan. 1994.*

(List continued on next page.)

*Primary Examiner*—Gail Hayes
*Assistant Examiner*—James Seal
(74) *Attorney, Agent, or Firm*—The Hecker Law Group

(57) ABSTRACT

The invention is a cryptographic system using chaotic dynamics. A set of initial conditions is generated from the private key and becomes input to the chaotic system. The chaotic system generates a set of final conditions from which the public key is derived. The public key is distributed to the public. The public key can be used to encrypt a message that is then decrypted using the private key. An adjustable back door of the invention derived from a set of interim conditions can be used in conjunction with the public key to derive the private key. The degree of difficulty involved in deriving the private key is dependent on the adjustable back door. That is the value of the back door can be adjusted to vary the difficulty involved in deriving the private key. In one embodiment of the invention, the chaotic system is based on the "N-body" problem to provide cryptographic security.

15 Claims, 6 Drawing Sheets

OTHER PUBLICATIONS

"GRAPE–3: Highly Parallelized Special–Purpose Computer for Gravitational Many–Body Simulations," by Okumura et al., IEEE (Conference sponsored by Pacific Res. Inst. Info. Syst. Management), pp. 151–160, Jan. 1992.*

Bruce Schneier, "Applied Cryptography" 2nd Edition pp 446–459.*

Jia Jiping; Yang Hui: "A New Method for Generating Keys," Proceedings of ICSP'96 (Beijing, China), vol. 2, 14–18, Oct. 1996 PUB IEEE, New York, New York, U.S.A.

Papadimitriou S., et al.: "Secure Communication with Chaotic Systems of Difference Equations," IEEE Transactions on Computers, vol. 46, No. 1, Jan. 1997, New York, New York, U.S.A.

* cited by examiner

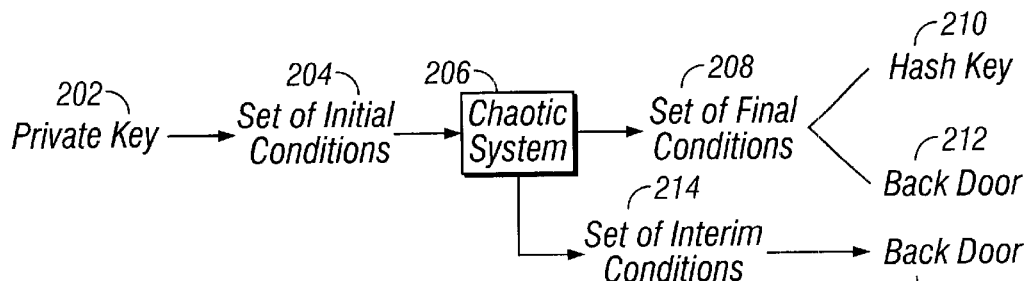
*Figure 2A*
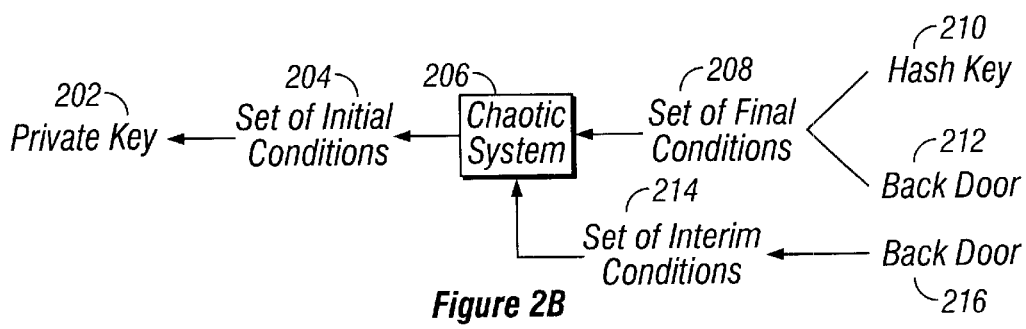
*Figure 2B*
$$\left\{ \begin{array}{l} \underline{Acceleration} \\ i^{th}\ Element: \\ \\ \\ \\ \underline{Momentum} \\ i^{th}\ Element: \\ \\ \underline{Positions} \\ i^{th}\ Element: \end{array} \right.$$
$-\text{sum}\begin{bmatrix}[x(i)-x(1)]^3\\ [x(i)-x(2)]^3\\ \vdots\\ [x(i)-x(n)]^3\end{bmatrix}\ (\text{mod } p)$
    Where $p = 2^e - 1$
$[[m(i) + a(i)]]\ (\text{mod } p)$
    Where $p = 2^e - 1$
$[[x(i) + m(i)]]\ (\text{mod } p)$
    Where $p = 2^e - 1$
*Figure 5*

CRYPTOGRAPHIC SYSTEM USING CHAOTIC DYNAMICS

BACKGROUND OF THE INVENTION

1. Field of the Invention

This invention relates to the field of cryptographic systems.

2. Background Art

A cryptographic system is a system for sending a message from a sender to a receiver over a medium so that the message is "secure", that is, so that only the intended receiver can recover the message. A cryptographic system (or cryptosystem) converts a message, referred to as "plaintext" into an encrypted format, known as "ciphertext." The encryption is accomplished by manipulating or transforming the message using a "cipher key" or keys. The receiver "decrypts" the message, that is, converts it from ciphertext to plaintext, by reversing the manipulation or transformation process using the cipher key or keys. So long as only the sender and receiver have knowledge of the cipher key, such an encrypted transmission is secure.

A "classical" cryptosystem is a cryptosystem in which the enciphering information can be used to determine the deciphering information. To provide security, a classical cryptosystem requires that the enciphering key be kept secret and provided to users of the system over secure channels. Secure channels, such as secret couriers, secure telephone transmission lines, or the like, are often impractical and expensive.

A system that eliminates the difficulties of exchanging a secure enciphering key is known as "public key encryption." By definition, a public key cryptosystem has the property that someone who knows only how to encipher a message cannot use the enciphering key to find the deciphering key without a prohibitively lengthy computation. An enciphering function is chosen so that once an enciphering key is known, the enciphering function is relatively easy to compute. However, the inverse of the encrypting transformation function is difficult, or computationally infeasible, to compute. Such a function is referred to as a "one way function" or as a "trap door function." In a public key cryptosystem, certain information relating to the keys is public. This information can be, and often is, published or transmitted in a non-secure manner. Also, certain information relating to the keys is private. This information may be distributed over a secure channel to protect its privacy (or may be created by a local user to ensure privacy).

In the prior art, the trap door functions have been based on the difficult problem of factoring integers. The factoring scheme is based on the fact that it is easy to generate two very large prime numbers and multiply them together, but it is much more difficult to factor the result, that is, to determine the very large prime numbers from their product. The product can therefore be made public as part of the enciphering key without compromising the prime numbers that effectively constitute the deciphering key.

Another form of public key cryptosystem is referred to as an "elliptic curve" cryptosystem. An elliptic curve cryptosystem is based on points on an elliptic curve E defined over a finite field F. Elliptic curve cryptosystems rely for security on the difficulty in solving the discrete logarithm problem. An advantage of an elliptic curve cryptosystem is there is more flexibility in choosing an elliptic curve than in choosing a finite field. Nevertheless, elliptic curve cryptosystems have not been widely used in computer-based public key exchange systems due to their computational intensiveness. Computer-based elliptic curve cryptosystems are slow compared to other computer public key exchange systems. Elliptic curve cryptosystems are described in "A Course in Number Theory and Cryptography" (Koblitz, 1987, Springer-Verlag, New York).

SUMMARY OF THE INVENTION

The invention is a cryptographic system using chaotic dynamics. A chaotic system is used to generate a public key and an adjustable back door from a private key. The public key is distributed and can be used in a public key encryption system. The invention can also be used for authentication purposes. The adjustable back door of the invention can be used in conjunction with the public key to derive the private key. The degree of difficulty involved in deriving the private key is dependent on the adjustable back door whose value can be adjusted to vary the difficulty involved in deriving the private key.

In its application to a public key encryption system, the invention uses a chaotic system model to generate a public key from a private key. A set of initial conditions is generated from the private key and becomes input to the chaotic system. The chaotic system generates a set of final conditions from which the public key is derived. The public key is distributed to the public. The public key can be used to encrypt a message that is then decrypted using the private key.

The invention can also be used for authentication. A chaotic system that implements a chaotic-dynamic model generates a public key from a private key. The public key is distributed to and stored at an authenticating site. During authentication, one wishing to authenticate oneself enters the private key that generated the public key into a chaotic system. The chaotic system implements the same chaotic-dynamic model that generated the public key from the private key. The output of the chaotic system is a public key. The authenticating system compares its stored public key with the new public key. If the two public keys are the same, authentication is successful. If the two public keys are not the same, authentication fails.

Using this approach, it is not necessary to disclose sensitive information to an authenticating system, or authenticator. Therefore, there is no need to rely on the authenticator to secure the information so that it is not accessible by an unauthorized person. Further, since the sensitive information is not transmitting to an authenticator, there is no danger of it being intercepted by an unauthorized person. Instead, a key that is not considered to be sensitive, the public key, is distributed and stored at the authenticating site. If authentication is performed as a prelude to accessing an account at a bank, for example, it is not necessary to store a bank user's pin number or other secret information. At the time of authentication, the bank user enters the private key used to generate the public key into the chaotic system. The public key that results is compared with the stored public key to authenticate the user.

In one embodiment of the invention, the chaotic system is based on the "N-body" problem to provide cryptographic security. The general N-body problem is described by a Hamiltonian from classical physics. A Hamiltonian function describes all forces between all N bodies. One manifestation is the celebrated N-body scenario of Newtonian gravity. In this particular setting, one considers N (greater than 2) bodies acting under mutual gravitation. For example, the Newtonian gravity manifestation of the N-body problem can be described by considering a solar system with three or more planets in orbit. Given an initial condition and a set of rules or equations governing motion of the planets over time, and which are subject to chaotic variation, the future positions of the planets after a known fixed time period (e.g. after ten solar years) can be determined. However, given only the present conditions of the planets, it is extremely difficult to determine what the initial conditions were without knowing the elapsed time, all the rules governing the motion of the planets, and all the chaotic variations in motion that occurred. Thus, the N-body problem is a one way function.

The N-body problem describes a "chaotic system". This is because slight perturbations to the initial conditions of one or more of the bodies will cause radical system changes in the future. Accordingly, an inexact estimate of such initial conditions will result in a faulty final state. If someone tried to guess the initial conditions and ran the system for 10 solar years, the resulting positions would be very different from the positions that would occur using the correct initial conditions.

The invention uses mathematical representations of the N-body problem. The composition of the N-body system, and its initial conditions, rules of motion and time period are known only to the sender. A future state can be generated using the initial conditions and is used in the encryption process to generate a public key.

BRIEF DESCRIPTION OF THE DRAWINGS

FIG. 2A provides an topographical view of an embodiment of the invention that illustrates a forward iteration.

FIG. 2B provides a topographical view of an embodiment of the invention wherein a backward iteration is used to produce a private key.

FIG. 5 illustrates acceleration, momentum, and position calculations for the $i^{th}$ element according to an embodiment of the invention.

DETAILED DESCRIPTION OF THE INVENTION

A cryptographic system using chaotic dynamics is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1:
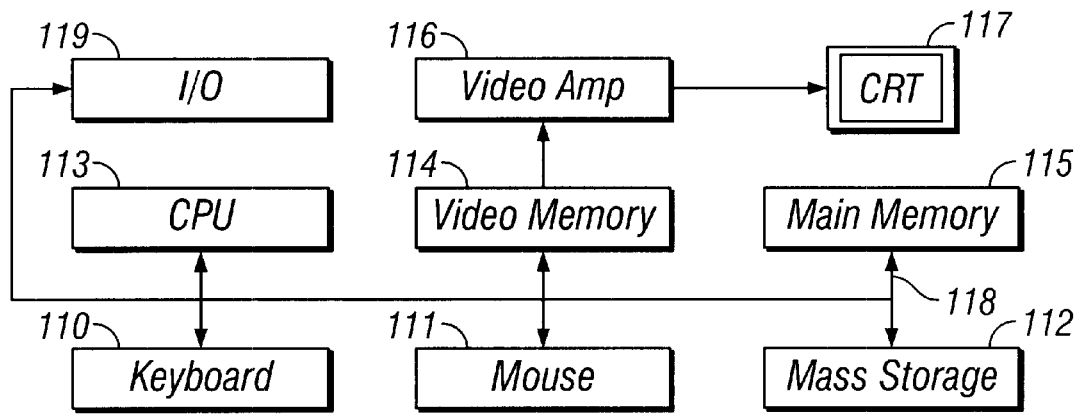
FIG. 1 provides an illustration of a computer system that can be used with the invention according to an embodiment of the invention.

The present invention can be implemented on a general purpose computer such as illustrated in FIG. 1. A keyboard 110 and mouse 111 are coupled to a bi-directional system bus 118. The keyboard and mouse are for introducing user input to the computer system and communicating that user input to CPU 113. The computer system of FIG. 1 also includes a video memory 114, main memory 115 and mass storage 112, all coupled to bi-directional system bus 118 along with keyboard 110, mouse 111 and CPU 113. The mass storage 112 may include both fixed and removable media; such as magnetic, optical or magnetic optical storage systems or any other available mass storage technology. Bus 118 may contain, for example, 32 address lines for addressing video memory 114 or main memory 115. The system bus 118 also includes, for example, a 32-bit DATA bus for transferring DATA between and among the components, such as CPU 113, main memory 115, video memory 114 and mass storage 112. Alternatively, multiplex DATA/address lines may be used instead of separate DATA and address lines.

In the preferred embodiment of this invention, the CPU 113 is a 32-bit microprocessor manufactured by Motorola, such as the 680X0 or Power PC processors or a microprocessor manufactured by Intel, such as the 80X86, or PENTIUM processor. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable means. This circuitry converts pixel DATA stored in video memory 114 to a raster signal suitable for use by monitor 117. Monitor 117 is a type of monitor suitable for displaying graphic images.

The computer system described above is for purposes of example only. The present invention may be implemented in any type of computer system or programming or processing environment.

Overview

A system in which a final state is unpredictable is referred to as a chaotic system. A small change in the initial condition of a chaotic system can cause a substantial difference in the predicted outcome or final state. The recovery of an initial state of a chaotic system is computationally infeasible by, for example, reversing the iterations used to arrive at the final condition.

The unpredictability of a chaotic system is used by the invention. A set of initial conditions is derived from a private key. The set of initial conditions becomes the input to the chaotic system. The chaotic system transforms the set of initial conditions into a public key over time, T. During time T, the chaotic system performs a number of iterations to transform the set of initial conditions into a final state. The final state is used to generate a public key.

Use of a chaotic system to generate the public key makes it infeasible for one to determine the private key with the public key alone by, for example, reversing the transformation. Where it is desired, however, the invention provides a back door that can be used to determine the private key in conjunction with the public key. The invention provides an adjustable back door to vary the degree of difficulty in generating the private key. For example, the back door can be a set of interim conditions within one or two iterations of initial conditions, or it can be less than all of the conditions at the same or other time period. It is easier (although still complex) to determine the private key with the former rather than the latter. In the latter case, it would be necessary to complete the set of interim conditions and derive the set of final conditions. The set of final conditions is input to the chaotic system to evolve the private key in a backward iteration.

The invention uses forward iteration of a chaotic system to derive a public key and back door from a private key. FIG. 2A provides a topographical view of an embodiment of the invention that illustrates a forward iteration. In a forward iteration, the invention produces a public key and a back door given a private key. Referring to FIG. 2A, private key 202 is used to generate a set of initial conditions 204. The set of initial conditions 204 becomes the input to chaotic system 206.

Chaotic system 206 is an unpredictable system. Thus, for example, a slight change to the set of initial conditions 204 can result in a dramatic change in the output, the set of final conditions 208. Further, it is computationally infeasible to re-produce private key 202 from public key 210. For a time period, T, chaotic system 206 performs a set of iterations to transform the set of initial conditions 204 into the set of final conditions 208. The set of final conditions 208 is used to generate public key 210 and back door 212.

In a public key encryption scheme, public key 210 can be published or transmitted in a non-secure manner. Public key 210 can be used to encrypt information. If distributed, private key 202 is distributed over a secure channel to protect its privacy (or may be created by a local user to ensure privacy). Private key 202 can be used to decrypt an encrypted message.

A first portion of the set of final conditions 208 is used to produce public key 210. A second portion of the set of final conditions 208 can be used to produce back door 212. Back door 212 is an adjustable back door. Back door 212 can be adjusted to vary the degree of difficulty involved in re-producing private key 202. For example, back door 212 can be comprised of all of the second portion of the set of final conditions 208. Alternatively, back door 212 can be comprised of some subset of the second portion of the set of final conditions 208.

The degree of difficulty in re-producing private key 202 would be greater when a subset of the second portion of the set of final conditions 208 is used to produce back door 212. Before private key 202 is re-produced, it is necessary to have all of the second portion of the set of final conditions.

It is further possible to produce a back door from a set of interim conditions 214. The set of interim conditions 214 is produced at a time prior to time T. A portion of the set of interim conditions 214, a back door portion, can be used to generate back door 216. Thus, for example, back door 216 can be produced using the all or some subset of the back door portion of the set of interim conditions 214 depending on the degree of difficulty desired for re-production of private key 202. To re-create private key 202, the set of interim conditions 214 must be intact. Chaotic system 206 is evolved using the set of interim conditions 214 to re-create private key 202.

FIG. 2B provides a topographical view of an embodiment of the invention wherein a backward iteration is used to produce a private key. In a backward iteration, the invention produces a private key using a public key and a back door. A backward iteration can be used, for example, in an authentication described in more detail below. Public key 210 is used along with a back door (e.g., back door 212 or back door 216) to generate a set of conditions (e.g., set of final conditions 208 or set of interim conditions 214). The set of conditions becomes input to chaotic system 206. Chaotic system 206 reverses the iterative process to produce a set of initial conditions 204. The set of initial conditions 204 is used to produce private key 202.

Chaotic system 206 is a system having a chaotic or dynamic nature. Chaotic system 206 is unpredictable. A slight change in the set of initial conditions 204 can result in a drastic change in 208. Chaotic system 206 can be an otherwise non-chaotic system for which some aspect of its definition has been modified to cause the system to become chaotic.

One example of a system that can be used with the present invention is the N-body system. An N-body system involves N orbital bodies that move in an orbit about a focus point. The laws of physics (Newton's laws of motion and gravitation and Keppler's law of orbits) indicate that a planet moves in an elliptical orbit about another mass such as the Sun. Given initial conditions, a planet's orbit can be predicted using the laws of physics. Further, the resulting change in a planet's orbit caused by a change in some or all of the planet's initial conditions is predictable.

The system is not limited to a single class of chaotic system. A system other than the N-body system (for which Newtonian gravity is one sub-example) can be used with the invention. Examples of other systems that can be used with the invention include: non-linear pendulum, chaotic bouncer, and other more modern systems that have proven to be extremely chaotic, such as the 3-dimensional Ising Model.

Motion

During chaotic motion of a particle, the original information about the particle's (e.g., planet's) position and velocity become disordered. Therefore, as a chaotic motion system such as an N-body system evolves, the initial condition is lost. In the Newtonian gravity manifestation of the N-body system, the force on a planet is:

$$F_i = m_i \frac{d^2 r_i}{dt^2} = -G \sum_{k \neq i} m_i m_k \frac{r_i - r_k}{|r_i - r_k|^3}$$

The above equation provides the force, $F_i$, on the $i^{th}$ planet where $m_i$ is the mass and $r_i$ is the position for the $i^{th}$ planet and G is the universal constant of gravitation. Where N is less than or equal to 2, motion has a predictable solution. The two bodies are in mutual orbit which, if bounded, is a mutual "double star" ellipse. Where N is greater than two, the motion of a planet becomes chaotic. A phenomena known as "whiplash" can occur when bodies come close together causing them to swerve rapidly away from each other. The "whiplash" phenomena can account for some or all of the unpredictable motion. In an unpredictable system, a small change in the initial condition results in a large change in the final condition.

Adjustable Back Door

In a cryptographic system, it may be desired that the private key be deducible from the public key. It may be, for example, that the owner of the private key wishes an alternate to act in their place. To accommodate this, the invention provides a technique whereby a private key can be recreated using the public key and a back door. The degree of difficulty to re-create the private key can be varied by varying the back door. That is, the technique provided by the invention includes the ability to adjust the back door to adjust the degree of difficulty required to re-create the private key.

If, for example, all of the back door is available along with the public key, it is possible to iterate the system in reverse order to arrive at the private key. However, if some portion of the back door is missing or the back door was generated from an interim state, more effort is needed to perform the reverse iteration. Total absence of a back door results in a computationally infeasible ability to reproduce the private key.

Model Definition

The invention can be implemented using a computer such as that illustrated in FIG. 1. The invention can be practiced using other computer systems or other types of computational tools as well.

A model is defined to implement the chaotic system. In a chaotic system model, it is not necessary to give any special meaning to constants such as the gravitational constant. Further, it is not necessary to use the concept of planetary motion or orbit. A model is preferably generated using equations to iterate motion such as the following:

acceleration=(function of position, momentum, and time)

momentum=momentum+acceleration*$dt$ position=position+momentum*$dt$ where dt is a time increment. Any value can be used for dt, however, to avoid explicit multiplication, dt can be set to one.

Preferably, the model is implemented using a computer system. Computer systems may differ in the manner in which they address precision issues. Precision can therefore become a problem where the model is implemented using different computer systems. A derived value can vary across computer systems. For example, a public key that is generated using one computer system with its own technique for handling precision issues can differ from the public key derived from the same private key on a system that implements a different approach for precision.

To port a model to different computer systems, it is important to establish rules of precision that each computer system must follow during model computations. Certain rules of precision can be identified and adhered to thereby allowing a more portable model. For example, a specified floating point or fixed point precision can be identified along with specific standards for round-off. Alternatively, integer arithmetic can be used such that values are generated using mod p where p is a large prime number to prevent overflow.

Figure 3:
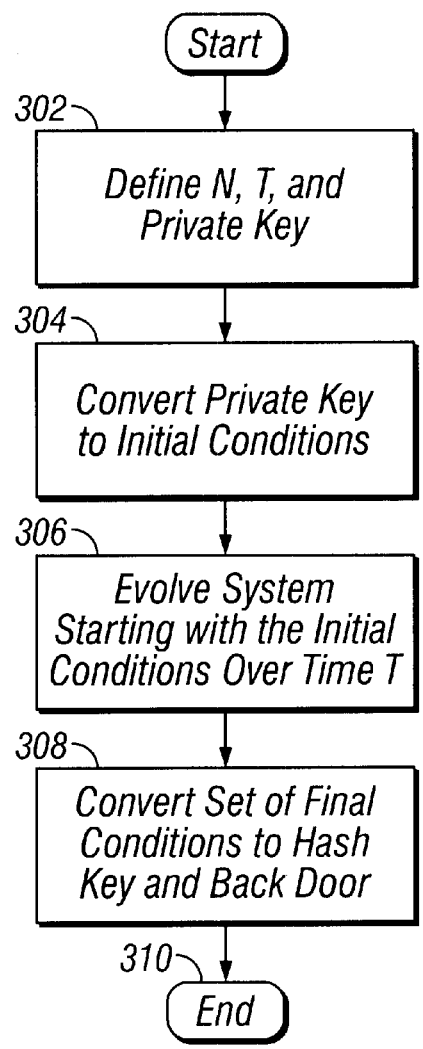
FIG. 3 provides a process whereby a public key and back door are generated given a private key using a motion model.

FIG. 3 provides a process whereby a public key and back door are generated given a private key using a motion model. At step 302, the number of bodies in motion (e.g., N>2), the transformation time, T (or the number of iterations), and the private key are determined. The private key can be produced using a random number generator, for example. At step 304, the private key is converted to a set of initial conditions. Preferably, the private key is converted into a set of initial conditions by populating position and momentum vectors.

For example, where N=3, a first half of the private key is split into three values that represent a position value for each of the three bodies. The second half of the private key is split into three values that represent the momentum of the three bodies. Thus, if an 128-bit private key is used, 64 bits are split to produce the initial positions and 64 bits are used to produce the momentum of the three bodies.

At step 306, the system is evolved over time T. For example, time T can be expressed in the number of iterations performed by the system. Each iteration performs a transformation on the initial conditions. Transformation is described in more detail below. At step 308, the final conditions are converted into a public key and a back door. Processing ends at step 310.

The chaotic system is iterated in the forward direction to generate a public key and, if desired, a back door. The private key can be generated using a backward iteration of the chaotic system using the public key and back door.

Forward Iteration

Figure 4:
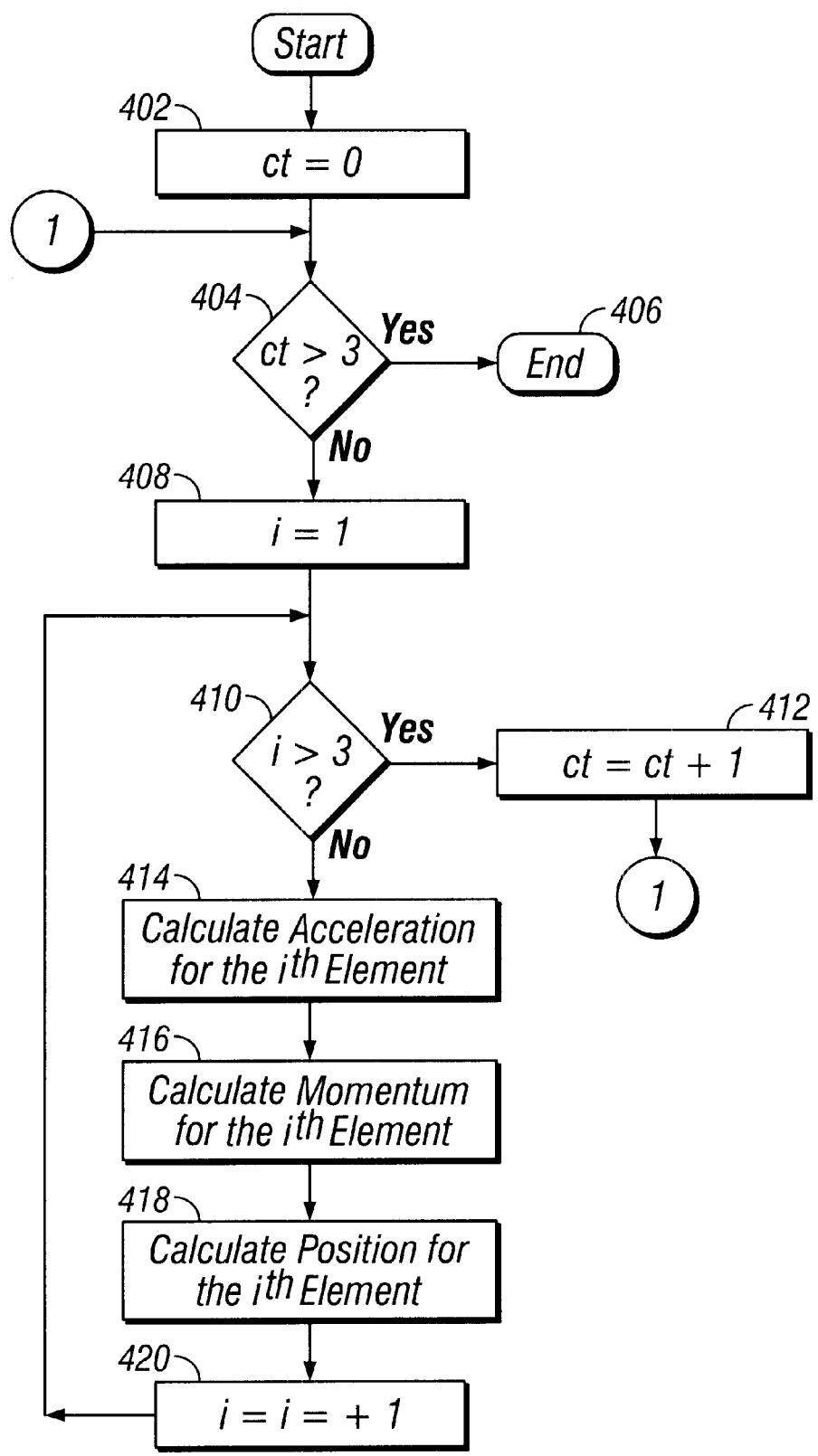
FIG. 4 provides a forward iteration process flow according to an embodiment of the invention.

In a forward iteration, the chaotic system of the invention manipulates the initial set of conditions to produce a set of final conditions and a plurality of interim condition sets as output. A set of interim conditions can be used to produce a back door. FIG. 4 provides a forward iteration process flow according to an embodiment of the invention. The forward iteration assumes a value for N equal to three (i.e., three bodies in motion). Other values for N can be used in the alternative.

Referring to FIG. 4, an outer loop counter, ct, is initialized to zero at tep 402. At step 404 (i.e., "ct>3?"), a determination is made whether the outer loop counter is greater than the number of bodies in motion. If so, processing ends at step 406. If not, processing continues at step 408 to initialize an inner loop counter, i, to one. At step 410 (i.e., "i>3?"), a determination is made whether i is greater than the number of bodies in motion. If so, processing continues at step 412 to increment the outer loop counter and processing continues at step 404. If not, processing continues at step 414.

At steps 414, 416, and 418 the system calculates the acceleration, momentum, and position, respectively, for the body designed by i. In this embodiment, the position information is used to derive a public key and momentum is used to derive a back door. At step 420, i is incremented and processing continues for any remaining bodies.

FIG. 5 illustrates acceleration, momentum, and position calculations for the $i^{th}$ element according to an embodiment of the invention. A mechanism such as an array is used to store the position, momentum, and acceleration values. The position values are stored in an array, x. To determine acceleration, the position information (e.g., as stored in a positions array) is summed. Specifically, the position of each element is subtracted from the $i^{th}$ element. The result of each subtraction operation is raised to the third power. This result is added to a sum. The sum is negated. A mod p operation is performed on the result of the negated sum. That is, acceleration associated with the $i^{th}$ element in the current iteration is the remainder of a division operation in which the sum is the dividend and p (e.g., $2^e-1$) is the divisor.

The acceleration is stored as, for example, an array, a, and momentum stored in array, m. The calculation of momentum for the $i^{th}$ element involves the element's current momentum and acceleration values. The current momentum for the $i^{th}$ element is determined by summing its previous momentum with its current acceleration. A mod p operation is performed on the sum. The $i^{th}$ element's current momentum is the remainder of a division operation where the sum is the dividend and p is the divisor.

Position for the ith element is determined by adding the element's current position with its current momentum. A mod operation is performed on the result as described above. The remainder of the mod p operation is the new position for the ith element.

Backward Iteration

In the forward iteration, a chaotic system manipulates the initial set of conditions to produce a set of final conditions as output. A backward iteration of the system manipulates the public key and back door to produce the private key. A backward iteration can be performed by backtracking the forward iteration. A motion model can use equations for backward iteration such as the following:

position=position−momentum*$dt$ acceleration=(function of position)

momentum=momentum−acceleration*$dt$ where dt is a time increment. Any value can be used for dt, however, to avoid explicit multiplication, dt can be set to one. Using this deterministic, backward iteration can be performed such that the set of initial conditions can be re-produced by evolving the system over time T.

Before a back door is used in a backward iteration, it must be complete. Thus, for example, if a back door consists of only partial condition information taken from a final set of conditions, the remaining condition information must be derived first.

To further illustrate, a back door and public key must have the same state to ensure that the chaotic system evolves the correct private key. Thus, if a back door was derived from a different set of conditions than the public key, a set of conditions should be identified such that the back door and the public key are in the same state. Thus, for example, if the back door was derived from a set of interim conditions at time T−10 (where T equals 18), the public key portion of the set of interim conditions for T−10 can be determined to arrive at a consistent state. Alternatively, the back door portion of the set of final conditions (T=18) is identified to arrive at a consistent state. A complete set of conditions (e.g., at T−10 or T=18) can be used in a backward iteration of the chaotic system to derive the private key.

Encryption

The public and private keys of the invention can be used in conjunction with an encryption mechanism to encrypt and decrypt messages. Examples of encryption mechanisms include Data Encryption Standard (DES); Rivest, Shamir, and Adleman (RSA); and Digital Signature Algorithm (DSA). DES is a symmetric encryption scheme (i.e., the same key is used for encryption and decryption. RSA and DSA are public key encryption schemes. Preferably, an one-way hash function is used for encrypting and decrypting such as Karn-Luby-Rackoff (KLR). Further to the discussion herein, a discussion of one-way hash functions is provided in chapter 18 of Schneier, *Applied Cryptography*, John Wiley (2d ed. 1996) which is incorporated herein by reference.

A hash function is a function that takes a variable-length input string and converts it to a fixed-length output string. A hash function used in a cryptosystem is preferably "one-way" and "collision free". A one-way hash function works in one direction. That is, it is easy to compute a hash value from an input string, but it is hard to generate an input string that hashes to a particular value. A collision-free hash function is one in which it is hard to generate two input strings with the same output string (i.e., hash value). Examples of one-way hash functions include: MD2, MD5, Secure Hash Algorithm (SHA), RIPE-MD, HAVAL. Other examples of one-way hash functions are provided in *Applied Cryptography*.

The output of a one-way hash function is not dependent on the input. A single bit change in the input can change half of the bits in the hash values. Further, given a hash value it is computationally infeasible to find an input string that hashes to that value.

A block of plaintext, $P_i$, can be encrypted with the result being a block of ciphertext, $C_i$, using the following equation that uses a hash function, H, a key, K, and the result of the previous hash operation, $C_{i-1}$:

$$C_i = P_i \oplus H(K, C_{i-1})$$

In the above equation, an "exclusive or" operation (denoted by the symbol ⊕) is performed between plaintext, $P_i$, and the result of the hash function, H. The hash function, H, hashes a block from a previous encryption, $C_{i-1}$, appended to the encryption key.

In the above equation, a single hash function is used for encryption. KLR uses a three-round encryption scheme wherein at least two different hash functions are used to encrypt the plaintext. The following provides an example of a three-round hash function:

$K_L = \frac{1}{2}(K); K_R = 1/2(K)$ (Step One)

$L_0 = \frac{1}{2}(P); R_0 = 1/2(P)$ (Step Two)

$R_1 = R_0 \oplus H(K_l, L_0)$ (Step Three)

$L_1 = L_0 \oplus H(K_r, R_1)$ (Step Four)

$R_2 = R_1 \oplus H(K_L, L_1)$ (Step Five)

$C = L_1 + R_2$ (Step Six)

At step one, the key, K, is divided into two halves, $K_L$ and $K_R$. The plaintext, P, is split into $L_0$ and $R_0$ at step two. The left portions of the plaintext, $L_0$, and the key, $K_L$, are appended and hashed with the result "exclusive or'd" with the right-hand portion of the plaintext, $R_0$, at step three. At step four, the right portions of the plaintext, $L_1$, and the key, $K_R$, are appended and hashed and "exclusive or'd" with the left-hand portion of the plaintext, $L_0$. At step five, the result of step three is "exclusive or'd" with the result of a hashing operation performed on the left-hand portion of the key, $K_L$, and the result of step four. The result of steps four and five are appended to obtain the ciphertext, C, at step six.

Using KLR, the transmission of encrypted data is expansionless. Thus, the underlying chaotic dynamics of the invention serve to entropize the plaintext without expanding it. The chaotic-dynamic approach of the invention can be used as a replacement for encryptors such as the Data Encryption Standard (DES).

Figure 9:
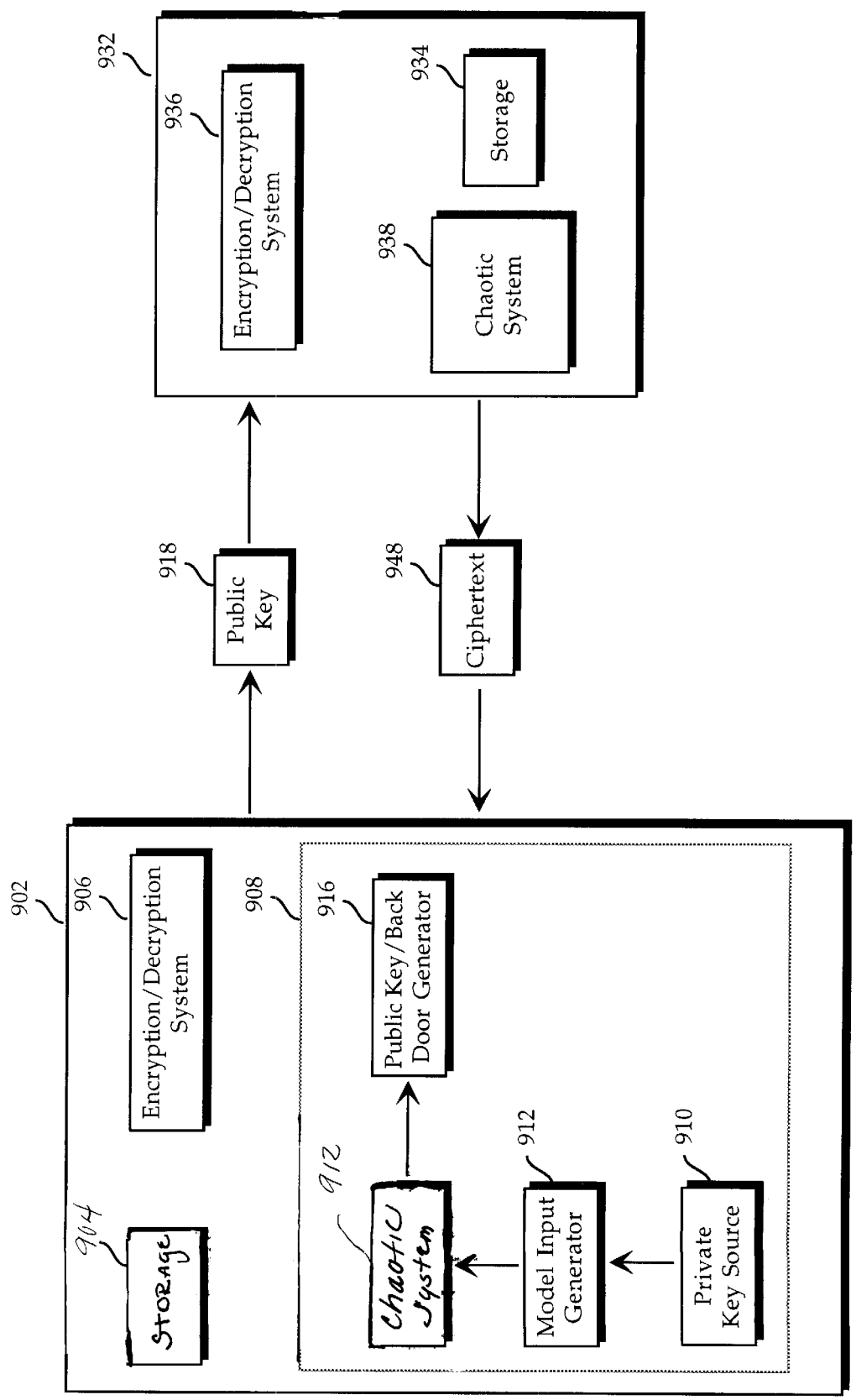
FIG. 9 provides an topographical view of encryption/decryption according to an embodiment of the invention.

FIG. 9 provides an topographical view of encryption/decryption according to an embodiment of the invention. System 902 generates a public key 918 and distributes it to system 932. Before transmitting a message to system 902, system 932 encrypts the message, ciphertext 948. System 932 transmits ciphertext 948 to system 902. System 902 decrypts ciphertext 948 to obtain the message.

System 902 includes storage 904 to, for example, store public keys and its private key. Encryption/Decryption system 906 is used to encrypt plaintext or decrypt ciphertext. Encryption/Decryption system 906 implements KLR, for example. Chaotic system 908 is used to generate public key 918. A private key source 910 provides a private key to model input generator 912. Private key source 910 is a random number generator, for example. Model input generator 912 derives a set of initial conditions for input to chaotic model 914. Chaotic model 914 implements the N-body system where N>2, for example. Chaotic model 914 outputs a set of final conditions that becomes input to the public key/back door generator 916. Public key/back door generator 916 derives public key 916.

Authentication

One application for the invention is an authentication scheme. Authentication is a mechanism whereby one's identity is verified to another. For, example, a bank can use an authentication system to verify that a user is one of its customers. Authentication is performed each time a user enters a password during a computer system's login sequence.

In the past, an authentication scheme wherein a password is entered for verification necessarily requires that the authenticator keep a record of the password. The authenticator may store the password for each entity having permission to access. When the authenticator receives a password, it compares the password input with the stored password to verify the input. If the two passwords are different, the authentication fails. For example, if the two passwords are the same, authentication is successful. If the authentication scheme is verifying a potential user of a computer system, the user login process is completed thereby allowing the user access to the system's resources. If a user attempts to access a bank account via a bank automated teller machine, for example, a successful authentication results in the user having access to the bank account to, for example, withdraw or deposit funds.

Figure 6:
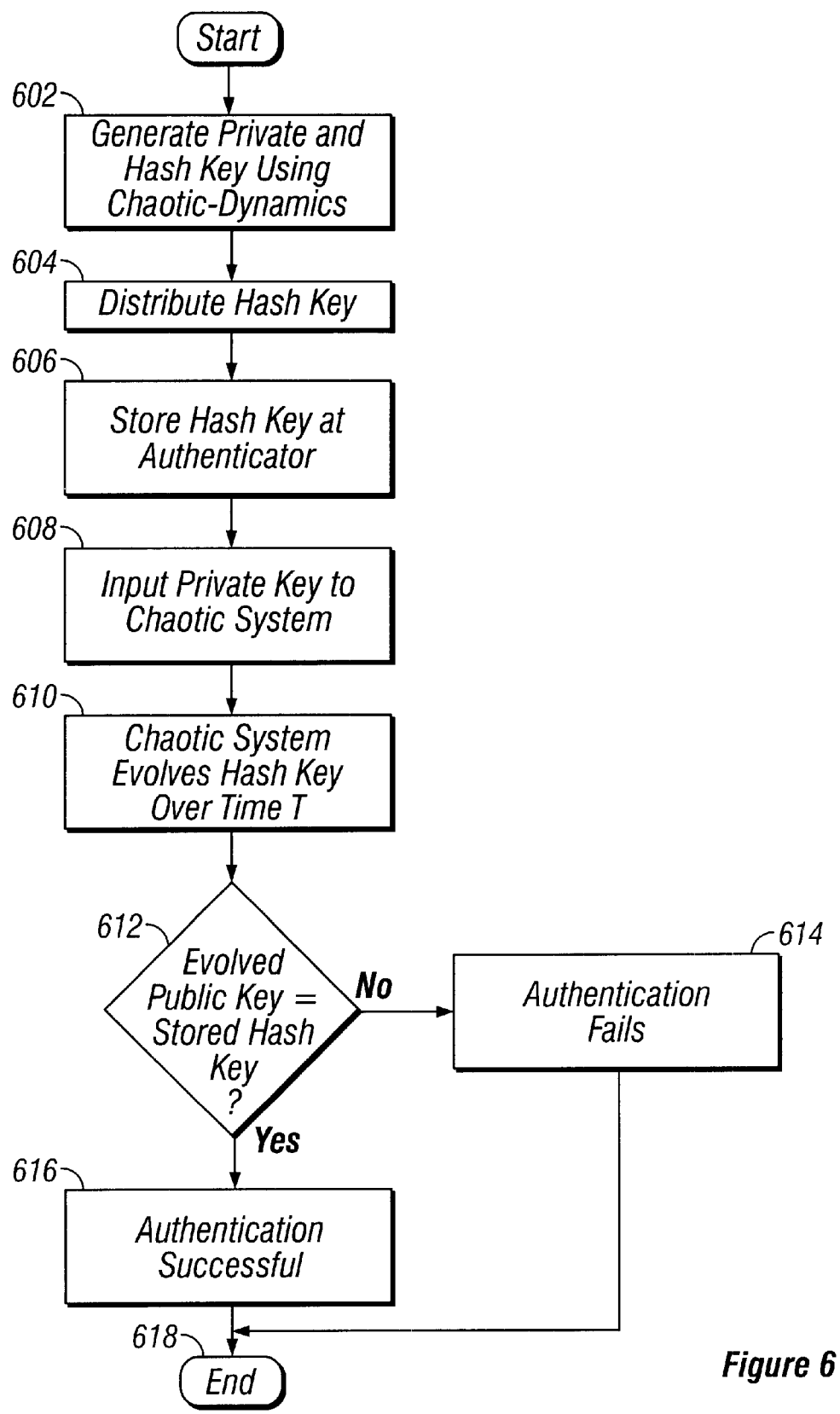
FIG. 6 provides an authentication process flow according to an embodiment of the invention.

Thus, in the previous authentication schemes, it was necessary for an authenticator to store sensitive information such as a password or a pin information. The invention can be used for authentication by verifying a stored public key against a public key that is generated at the time of authentication. If the two are the same, the authentication is successful. If the two public keys are not the same, the authentication fails. A public key is created by inputting a private key to a chaotic system and distributed to an authenticator. At the time of authentication, a public key is generated by inputting the same private key into the chaotic system. FIG. 6 provides an authentication process flow according to an embodiment of the invention.

At step 602, chaotic system is used to generate a private and public key. The public key is publicly disseminated at step 604. The authenticator receives the public key and retains it at step 606. To authenticate oneself, an unauthenticated user must input the private key to the chaotic system at step 608. The chaotic system evolves over time, T, to generate an evolved public key at step 610. At step 612 (i.e., "evolved public key=stored public key?"), the authenticator determines whether the public key generated from the unauthenticated user's private key is the same as the stored public key. If not, authentication fails at step 614. If so, authentication is successful at step 616. Authentication processing ends at step 618.

Figure 8:
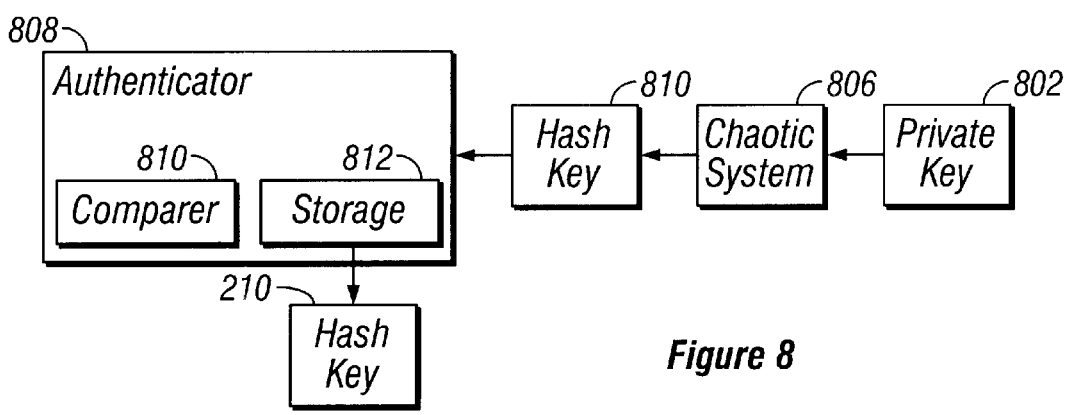
FIG. 8 provides a topography of authentication according to an embodiment of the invention.

FIG. 8 provides a topographical view of authentication according to an embodiment of the invention. Authenticator 808 is used to verify the identify of an unauthenticated user. Authenticator 808 includes comparer 810 and storage 812. Referring to FIG. 2A, private key 202 is used to create the set of initial conditions 204 for chaotic system 206. Chaotic system 206 outputs a public key 210 derived from the set of final conditions 208 and a back door (e.g., back door 212 and back door 216). Referring to FIG. 8, public key 210 is distributed to authenticator 808. Storage 812 retains public key 210.

During authentication, a private key 802 is input to chaotic system 806 by an unauthenticated user. Chaotic System 806 implements the same chaotic model as the chaotic system that generated public key 210 (i.e., chaotic system 206). Chaotic system 806 generates public key 810. Public key 810 becomes input to Authenticator 808. Comparer 810 compares public key 210 stored in storage 812 with public key 810. If public key 210 and public key 810 are the same, the identify of the user is verified to authenticator 808. If the two keys are different, the user is not verified to authenticator 808.

In FIG. 6, the unauthenticated user had knowledge of the private key. It is also possible that the unauthenticated user does not have knowledge of the private key, but possesses some amount of information to re-create the private key. It may be desired, for example, that an alternate be able to gain access as well. The invention provides a mechanism that allows the holder of a private key to provide information to an alternate to allow such access. Given a public key and an adjustable back door, an alternate can re-produce the private key. With the private key, the alternate can act on behalf of the private key holder. As discussed above, the back door information supplied to an alternate can be adjusted to vary the degree of difficulty involved in re-producing the private key. Different alternates can be given different back doors. Thus, one alternate can be given a back door that can be more easily used to re-create the private key than another alternate.

Figure 7:
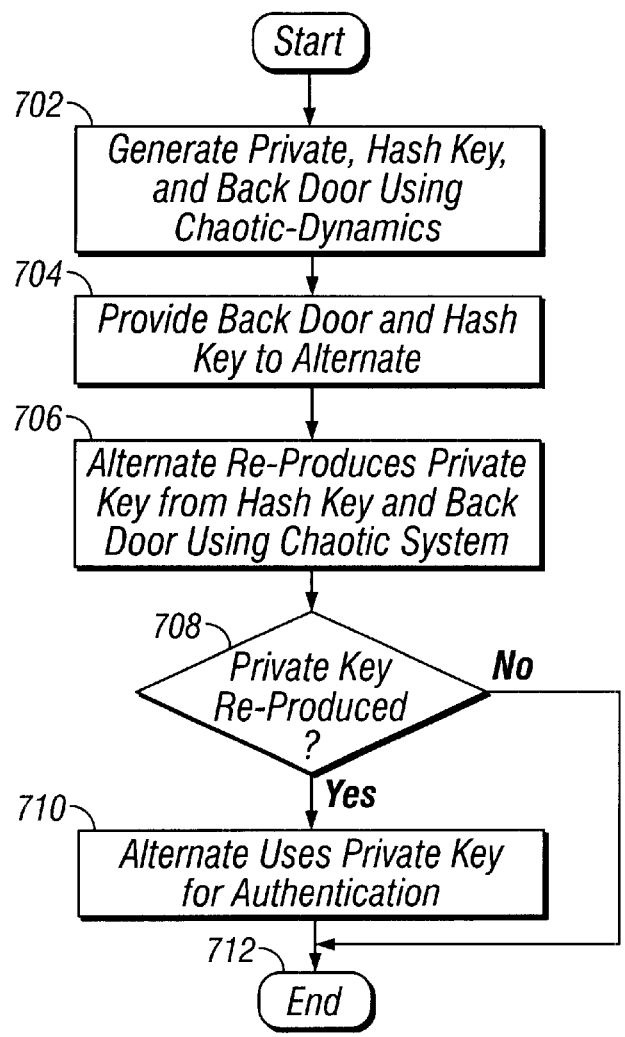
FIG. 7 provides an alternate authentication process flow according to an embodiment of the invention.

With the public key and an adjustable back door, an alternate must first generate the private key. If the alternate is able to re-create the private key, the alternate can attempt to gain access using the private key. FIG. 7 provides an alternate authentication process flow according to an embodiment of the invention.

At step 702, a private key, public key and back door are generated using chaotic-dynamics. The back door and public key are provided to an alternate at step 704. At step 706, the alternate re-produces the private key using the public key and back door information with the chaotic system. At step 708 (i.e., private key re-produced?"), a determination is made whether a private key was generated. If not, processing ends as step 712. If so, processing continues at step 710.

At step 710, the alternate uses the re-produced private key for authentication. The process flow provided in FIG. 6 can be used for authentication. As discussed above, the public key generated from the original private key is distributed to and stored at the authenticator. The alternate uses the re-produced private key to generate an evolved public key. If the evolved public key is the same as the stored public key, the alternate is authenticated. If not authentication of the alternate fails.

Referring to FIG. 8, an alternate enters private key 802. Private key 802 is generated as described above with reference to FIG. 2B, for example. Public key 210 becomes input to chaotic system 206 along with a back door. If, for example, back door 212 was given to the alternate, the alternate inputs public key 210 and back door 212 to chaotic system 206. The private key that is generated by chaotic system 206 can be used by the alternate as input to chaotic system 806 (i.e., private key 802). If the correct private key is used as private key 802 by the alternate, verification of the alternate is successful. If not, the alternate is not authenticated by authenticator 808.

Thus, a cryptographic system using chaotic dynamics has been provided.

What is claimed is:

1. A method of generating a key in a cryptosystem comprising the steps of:

generating a private key;

deriving a set of initial conditions using said private key;

applying said set of initial conditions as input to an N body chaotic system;

said N body chaotic system generating a set of final conditions from said set of initial conditions; and generating a hash key from said set of final conditions.

2. The method of claim 1 further comprising the step of generating a back door key using said chaotic system.

3. The method of claim 2 wherein said output is a set of final conditions.

4. The method of claim 2 wherein said step of generating further comprises the steps of:
   said chaotic system generating a set of interim conditions from said set of initial conditions; and
   deriving said back door key from said set of interim conditions.

5. The method of claim 1 further comprising the step of determining said private key via using a set of conditions that represent a state of said chaotic system.

6. The method of claim 5 wherein said set of conditions that represent a state of said chaotic system are derived from said hash key, and a back door key is derived from a set of interim conditions of said chaotic system.

7. A cryptographic key generation system comprising:
   an input generator;
   an N body chaotic model coupled to said input generator, said chaotic system generating model output;
   a key generator coupled to said N body chaotic system for deriving a hash key using said model output.

8. The system of claim 7 wherein said input generator comprises:
   a private key source; and
   a model input generator coupled to said private key source.

9. The system of claim 9 further comprising:
   a back door key generator coupled to said chaotic model.

10. An encryption method comprising the steps of:
    in a sender computer system:
       generating a private key;
       generating a hash key in N body chaotic system using said private key;
       distributing said hash key to a receiver system;
    in said receiver system:
       storing said hash key;
       encrypting a plaintext message using said hash key.

11. An article of manufacture comprising:
    a computer usable medium having computer readable program code embodied therein for generating a key in a cryptosystem comprising:
    computer readable program code configured to cause a computer to generate a private key;
    computer readable program code configured to cause a computer to derive a set of initial conditions using said private key;
    computer readable program code configured to cause a computer to apply said set of initial conditions as input to an N body chaotic system;
    computer readable program code configured to cause a computer to generate a set of final conditions from said set of initial conditions; and
    computer readable program code configured to cause a computer to generate a hash key from said set of final conditions.

12. The article of manufacture of claim 11 further comprising:
    computer readable program code configured to cause a computer to generate a back door key using said N body chaotic system.

13. The article of manufacture of claim 12 further comprising:
    computer readable program code configured to cause a computer to generate a set of interim conditions from said set of initial conditions; and
    computer readable program code configured to cause a computer to derive said back door key from said set of interim conditions.

14. The article of manufacture of claim 11 further comprising computer readable program code configured to cause a computer to determine said private key via using a set of conditions that represent a state of said N body chaotic system.

15. The article of manufacture of claim 14 wherein said set of conditions that represent a state of said N body chaotic system are derived from said hash key and a back door is derived from a set of interim conditions of said N body chaotic system.

* * * * *